United States Patent [19]
Bresson

[11] 3,887,930
[45] June 3, 1975

[54] LIGHT COMPENSATION FOR EXPOSURE CONTROL CAMERAS

[75] Inventor: Richard J. Bresson, Hamlin, N.Y.

[73] Assignee: Eastman Kodak Company, Rochester, N.Y.

[22] Filed: July 12, 1974

[21] Appl. No.: 488,613

[52] U.S. Cl. .................................. 354/59; 354/197
[51] Int. Cl. ............................................. G01j 1/22
[58] Field of Search .............................. 354/59, 197

[56] References Cited
UNITED STATES PATENTS
3,454,323  7/1969  Dierks .................................. 354/59
3,836,934  9/1974  Suzuki ................................. 354/197

*Primary Examiner*—John M Horan
*Attorney, Agent, or Firm*—R. F. Brothers

[57] ABSTRACT

A camera includes a primary lens, a converter lens selectively usable to change the camera's effective focal length and an exposure control device which includes a photocell. The converter lens, movable into and out of the camera's optical path, has predetermined light loss and color contribution factors. A cover glass having approximately one-half the light loss factor and approximately the same color contribution factor as the converter lens is movable from a position affecting the light directed toward the photocell when the converter lens is in the camera's optical path to a position affecting light directed toward the primary lens when the converter lens is removed from the optical path.

6 Claims, 2 Drawing Figures

PATENTED JUN 3 1975  3,887,930

LIGHT COMPENSATION FOR EXPOSURE CONTROL CAMERAS

CROSS-REFERENCE TO RELATED APPLICATIONS

Reference is made to commonly assigned, copending U.S. patent application Ser. No. 477,581 entitled FOCUSING DEVICE FOR CAMERA HAVING SELECTABLE FOCAL LENGTHS, filed in the names of Loenard F. Kamp and Edward J. Koval on June 10, 1974.

BACKGROUND OF THE INVENTION

1. Field of the Invention

The present invention relates to means for compensating for the light loss and color contribution of a converter lens which is movable into and out of the camera's optical path to change the camera's effective focal length.

2. Description of the Prior Art

Cameras having converter lenses movable into and out of the camera's optical path to change the camera's effective focal length are known. One such camera is disclosed in co-assigned, copending U.S. patent application Ser. No. 477,581, filed June 10, 1974, in the names of Leonard F. Kamp and Edward J. Koval. In that application, a converter lens is shown movable between a "taking" position in line with the primary lens and a "stored" position removed from such alignment. Since lens elements invariably have some light loss and color contribution associated therewith, cameras of this type which also employ automatic exposure control must include means for compensating for these lens characteristics. Otherwise, a photograph taken with the converter lens in the "taking" position would have less exposure and might be of a different tint than a photograph of the same scene and light condition taken with the converter lens in the "stored" position.

In the past, the light loss phenomena has been compensated for by placing either a mask or a filter over the photocell when the converter lens is in a taking position. The mask or filter would have the same light loss characteristics as the taking lens. However, this would not solve the problem of color correction.

SUMMARY OF THE INVENTION

It is an object of the present invention to provide a camera with a mechanism for compensating for light loss and color contribution of a converter lens of the type described hereinbefore. Another object includes the provision of means to protect the camera's internal mechanism by the same means provided for compensating for light loss and color contribution.

In keeping with the above objects, the illustrated embodiment of the camera according to the present invention includes a primary lens, a converter lens having predetermined light loss and color contribution factors and a photocell which is part of an exposure control device. Optical means having a light loss factor of approximately one-half that of the converter lens and the same color contribution characteristics is movable between a position affecting the light directed toward the photocell when the converter lens is in front of the primary lens and to a position effecting light directed toward the primary lens when the converter lens is in its "stored" position. When in line with the primary lens, the optical means may function as a cover glass for protecting the camera's internal mechanism, such as for example the camera's shutter blade.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENT

Figure 1:
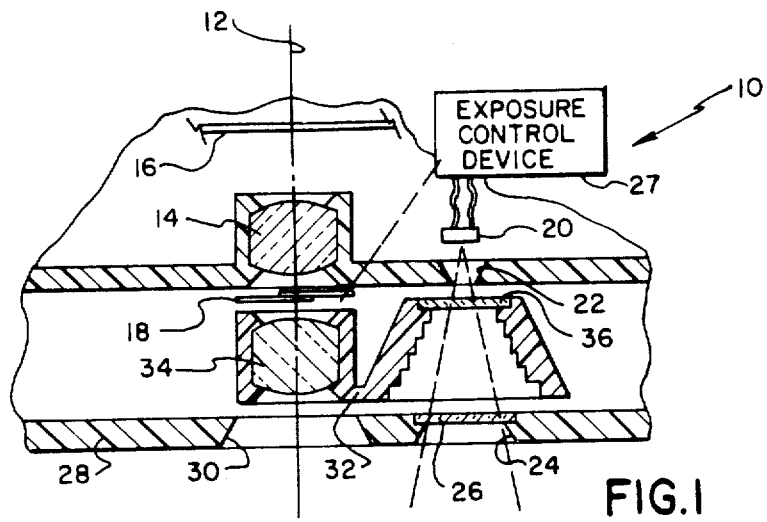
FIG. 1 is a top sectional view showing a portion of a camera in accordance with the present invention, the camera being shown with the converter lens in alignment with the camera's optical axis.

Because cameras are well known, the present description will be directed in particular to elements forming part of, or cooperating more directly with apparatus in accordance with the present invention. It is to be understood that camera elements not specifically shown or described may take various forms well known to those skilled in the art.

Referring to the drawings, a camera, partially shown at 10, having an optical axis 12, includes a primary lens 14 aligned with the optical axis and in front of a film plane 16. A shutter mechanism 18 of any known configuration is positioned in front of primary lens 14 and is operable in a known manner to effect exposure of received film at film plane 16.

A photocell 20 is positioned behind apertures 22 and 24, the latter being provided with a cover plate 26. Photocell 20 is connected to an exposure control device, diagramatically shown at 27, which operates in a known manner to vary the exposure duration and/or the diaphragm opening in accordance with scene light. Since there are many such devices known to those skilled in the art, no description of the exposure control device will be made herein.

Front wall 28 of camera 10 has an opening 30 aligned with primary lens 14. Behind the front wall, a lens carrier 32 is movable laterally between the position shown in FIG. 1 and that of FIG. 2. Lens carrier 32 includes a mount for holding a converter lens 34 in such a manner that when the lens carrier is in its FIG. 1 position, the converter lens is in the camera's optical path aligned with optical axis 12. When the lens carrier is moved to its FIG. 2 position, the converter lens is positioned out of alignment with the optical path.

Figure 2:
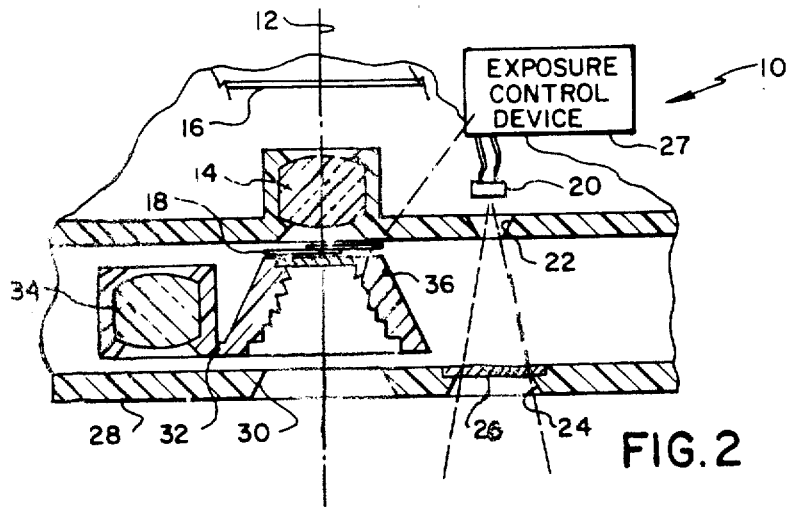
FIG. 2 is a view similar to that of FIG. 1 with the converter lens in its stored position.

Converter lens 34, when in its FIG. 1 or "taking" position is effective to change the camera's effective focal length. For example, in the illustrated embodiment, primary lens 14 may be a standard or wide angle lens and, when converter lens 34 is in its taking position, the camera's effective focal length is changed to telephoto.

Converter lens 34 has, as does all optical elements, some degree of light loss, either by absorption, reflection or both. Therefore, when the converter lens is in its FIG. 2 or "stored" position, more of the scene light will reach film plane 16 than when the converter lens is in its taking position. Accordingly, if the exposure control device is calibrated for proper exposure when the converter lens is in its taking position, the pictures will be over-exposed when the converter lens is in its stored position. Likewise, if the exposure control device is calibrated for proper exposure when the converter lens is in its stored position, the pictures will be under-exposed when the converter lens is in its taking position.

It can also be seen that in its taking position, converter lens 34 acts as a cover for shutter mechanism 18, preventing foreign objects from reaching the shutter mechanism. When removed to its stored position, the converter lens can no longer serve its purpose and the shutter mechanism would be susceptible to damage from outside the camera. Of course, a second cover glass such as that of cover glass 26 may be provided in aperture 30, but by the present invention, I have provided a single device for both correcting for the difference in light loss upon movement of converter lens 34 and for protecting shutter mechanism 18.

That dual purpose device includes a cover plate 36 carried by lens carrier 32 in such a position that the cover glass is aligned with photocell 20 to effect light directed thereto when converter lens 34 is in its "taking" position and is aligned with primary lens 14 for effecting light to that lens when the converter lens is in its "stored" position.

Cover plate 36 is formed of a transparent material having a light loss factor of approximately one-half that of converter lens 34 and a color contribution factor approximately the same as the converter lens. Accordingly, the transmission loss of the light reaching photocell 20 will always be one-half that of the light reaching primary lens 14, regardless of whether converter lens 34 is in its "taking" or "stored" positions. This constant difference can be compensated for in the exposure control device. Further, cover plate 36 replaces converter lens 34 as a protective covering for shutter mechanism 18 when the converter lens is moved to its "stored" position.

The invention has been described in detail with particular reference to preferred embodiments thereof, but it will be understood that variations and modifications can be effected within the spirit and scope of the invention.

I claim:

1. In a camera having a primary lens; a converter lens having a predetermined light loss factor and a predetermined color contribution factor, said converter lens being movable between a taking position in optical alignment with said primary lens and a stored position out of optical alignment with said primary lens; and a photocell which is part of an exposure control device; the improvement comprising:
    optical means having a light loss factor of approximately one-half that of said converter lens and a color contribution factor substantially the same as that of said converter lens;
    means for mounting said optical means for movement between a first position affecting light directed toward said primary lens and a second position affecting light directed toward said photocell; and
    means for moving said optical means to its first position when said converter lens is in its stored position and for moving said optical means to its second position when said converter lens is in its taking position.

2. In a camera having a primary lens; a converter lens having a predetermined light loss factor and a predetermined color contribution factor; a lens mount for said converter lens, said lens mount being movable in a plane perpendicular to the optical axis of said primary lens for moving said converter lens between a taking position in alignment with said optical axis and a stored position out of alignment with said optical axis; and a photocell which is part of an exposure control device; the improvement comprising:
    optical means having a light loss factor of approximately one-half that of said converter lens and having substantially the same color contribution factor as said coverter lens; and
    means on said lens mount for mounting said optical means in a position wherein said optical means is (1) aligned with said photocell when said converter lens is in its taking position and (2) aligned with the optical axis of said primary lens when said converter lens is in its stored position.

3. In a camera having a casing defining an aperture; a primary lens aligned with said aperture; a shutter mechanism between said primary lens contribution said aperture; a converter lens having a predetermined color conbribution factor; a lens mount for said converter lens, said lens mount being movable for moving said converter lens between a taking position between said aperture and said shutter mechanism and a stored position out of alignment with said aperture; the improvement comprising:
    a cover glass having substantially the same color contribution factor as said converter lens; and
    means on said lens mount for mounting said cover glass in a position wherein said cover glass is (1) aligned with said aperture and between said aperture and said shutter mechanism when said converter lens is in its stored position and (2) out of alignment with said aperture when said converter lens is in its taking position.

4. The improvement as defined in claim 3 wherein said converter lens has a predetermined light loss factor and wherein said cover glass has a light loss factor of approximately one-half that of said converter lens.

5. In a camera having a casing defining first and second apertures; a primary lens aligned with said first aperture; a shutter mechanism between said primary lens and said first aperture; a photocell which is part of an exposure control device and which is aligned with said second aperture; a converter lens having a predetermined light loss factor; a lens mount for said converter lens and movable between a position in which said converter lens is in a taking position between said first aperture and said shutter mechanism and a position in which said converter lens is in a stored position out of alignment with said first aperture; the improvement comprising:
    a cover glass having a light loss factor of approximately one-half that of said converter lens; and
    means on said lens mount for mounting said cover glass in a position wherein said cover glass is (1) aligned with said first aperture and between said first aperture and said shutter mechanism when said converter lens is in its stored position and (2) aligned with said second aperture and between said second aperture and said photocell when said converter lens is in its taking position.

6. The improvement as defined in claim 5 wherein said converter lens has a predetermined color contribution factor and wherein said cover glass has a color contribution factor substantially the same as that of said converter lens.

* * * * *